US008914520B2

(12) United States Patent  
Grayson et al.

(10) Patent No.: US 8,914,520 B2  
(45) Date of Patent: Dec. 16, 2014

(54) SYSTEM AND METHOD FOR PROVIDING ENTERPRISE INTEGRATION IN A NETWORK ENVIRONMENT

(75) Inventors: Mark Grayson, Maidenhead (GB); Jayaraman R. Iyer, San Jose, CA (US); Rajesh S. Pazhyannur, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 650 days.

(21) Appl. No.: 12/619,273

(22) Filed: Nov. 16, 2009

(65) Prior Publication Data

US 2011/0119740 A1 May 19, 2011

(51) Int. Cl.
| | | |
|---|---|---|
| G06F 15/16 | (2006.01) | |
| H04L 12/66 | (2006.01) | |
| H04W 12/06 | (2009.01) | |
| H04L 12/46 | (2006.01) | |
| H04W 84/04 | (2009.01) | |
| H04L 29/06 | (2006.01) | |

(52) U.S. Cl.
CPC ............ *H04W 12/06* (2013.01); *H04W 84/045* (2013.01); *H04L 12/4641* (2013.01); *H04L 63/0272* (2013.01)
USPC .......................................... 709/227; 370/352

(58) Field of Classification Search
USPC ....................................................... 709/227
See application file for complete search history.

(56) References Cited

U.S. PATENT DOCUMENTS

| | | | |
|---|---|---|---|
| 5,432,907 A * | 7/1995 | Picazo et al. .................. 709/249 |
| 6,094,578 A | 7/2000 | Purcell et al. | |
| 6,108,789 A * | 8/2000 | Dancs et al. ...................... 726/9 |
| 6,185,205 B1 | 2/2001 | Sharrit et al. | |
| 6,233,315 B1 | 5/2001 | Reformato et al. | |
| 6,385,651 B2 * | 5/2002 | Dancs et al. .................. 709/227 |
| 6,745,246 B1 | 6/2004 | Erimli et al. | |

(Continued)

FOREIGN PATENT DOCUMENTS

| | | |
|---|---|---|
| CN | 102158896 | 8/2011 |
| WO | WO2012/038911 | 3/2012 |
| WO | WO2013/167190 | 11/2013 |

OTHER PUBLICATIONS

USPTO Feb. 7, 2012 Response to Nov. 9, 2011 Non-Final office Action from U.S. Appl. No. 12/539,446.

(Continued)

*Primary Examiner* — Brian P Whipple  
*Assistant Examiner* — James Edwards  
(74) *Attorney, Agent, or Firm* — Patent Capital Group

(57) ABSTRACT

A method is provided in one example embodiment and includes receiving a request to authenticate an end user in a service provider network, and evaluating the request to identify the end user as belonging to an enterprise network. A tag is generated for a packet associated with a flow for the end user in the enterprise network. Routing occurs for subsequent packets associated with the flow between the enterprise network and the end user. The subsequent packets associated with the flow are not routed through the service provider network. In more particular embodiments, the end user is authenticated in the enterprise network after being authenticated in the service provider network. In addition, traffic for the end user can be separated based on one or more tags identified within the flow. A plurality of flows can be classified based on a customer identification (CID). The tag can be a virtual local area network (VLAN) tag generated at a base station.

20 Claims, 5 Drawing Sheets

(56) References Cited

U.S. PATENT DOCUMENTS

| | | | |
|---|---|---|---|
| 6,813,250 B1* | 11/2004 | Fine et al. | 370/256 |
| 6,912,389 B2 | 6/2005 | Bright et al. | |
| 7,072,952 B2 | 7/2006 | Takehiro et al. | |
| 7,339,900 B2 | 3/2008 | Perlman | |
| 7,345,991 B1* | 3/2008 | Shabtay et al. | 370/221 |
| 7,352,707 B2 | 4/2008 | Ho et al. | |
| 7,369,513 B1 | 5/2008 | Sankaran | |
| 7,460,492 B2 | 12/2008 | Portolani et al. | |
| 7,463,597 B1 | 12/2008 | Kompella | |
| 7,555,546 B1* | 6/2009 | Anumala | 709/224 |
| 7,574,202 B1* | 8/2009 | Tsao et al. | 455/411 |
| 7,685,295 B2* | 3/2010 | Myers et al. | 709/228 |
| 7,724,656 B2 | 5/2010 | Sagfors | |
| 8,064,480 B2 | 11/2011 | Bitter et al. | |
| 8,089,963 B2* | 1/2012 | Melman et al. | 370/389 |
| 8,112,330 B1* | 2/2012 | Grandcolas et al. | 705/35 |
| 8,130,655 B2 | 3/2012 | Foottit | |
| 8,194,556 B2 | 6/2012 | Tacconi et al. | |
| 8,335,161 B2 | 12/2012 | Foottit | |
| 2002/0191572 A1* | 12/2002 | Weinstein et al. | 370/338 |
| 2005/0118946 A1 | 6/2005 | Colban et al. | |
| 2005/0201406 A1 | 9/2005 | Sekine et al. | |
| 2005/0223111 A1* | 10/2005 | Bhandaru et al. | 709/236 |
| 2005/0256969 A1* | 11/2005 | Yancey et al. | 709/238 |
| 2006/0050667 A1 | 3/2006 | Verma et al. | |
| 2006/0199591 A1 | 9/2006 | Klatt | |
| 2006/0281471 A1 | 12/2006 | Shaffer et al. | |
| 2007/0183404 A1* | 8/2007 | Hofer | 370/352 |
| 2008/0084822 A1 | 4/2008 | Sagfors | |
| 2008/0095086 A1* | 4/2008 | Linkola et al. | 370/310 |
| 2008/0101301 A1 | 5/2008 | Thomas et al. | |
| 2008/0155094 A1* | 6/2008 | Roese et al. | 709/224 |
| 2008/0253342 A1* | 10/2008 | So et al. | 370/338 |
| 2009/0005053 A1 | 1/2009 | Agin | |
| 2009/0059795 A1 | 3/2009 | Fonseca et al. | |
| 2009/0163216 A1 | 6/2009 | Hoang et al. | |
| 2009/0219888 A1 | 9/2009 | Chen et al. | |
| 2010/0075658 A1 | 3/2010 | Hou et al. | |
| 2010/0093351 A1 | 4/2010 | Barrett et al. | |
| 2010/0113032 A1 | 5/2010 | Lee et al. | |
| 2010/0113035 A1 | 5/2010 | Eskicioglu et al. | |
| 2010/0165960 A1 | 7/2010 | Richardson | |
| 2010/0232293 A1 | 9/2010 | Sagfors | |
| 2010/0290398 A1* | 11/2010 | Choudhary et al. | 370/328 |
| 2011/0021196 A1* | 1/2011 | Grayson et al. | 455/435.2 |
| 2011/0082924 A1 | 4/2011 | Gopalakrishnan | |
| 2011/0170408 A1 | 7/2011 | Furbeck et al. | |
| 2011/0299395 A1 | 12/2011 | Mariblanca Nieves | |
| 2012/0051216 A1 | 3/2012 | Zhang et al. | |
| 2012/0096159 A1* | 4/2012 | Short et al. | 709/225 |

OTHER PUBLICATIONS

F. Adrangi et al., Identity Selection Hints for the Extensible Authentication Protocol (EAP); RFC 4284; Jan. 2006; http://ietfreport.isoc.org/rfc/PDF/rfc4284.pdf; 14 pages.

USPTO Feb. 29, 2012 Final Office Action from U.S. Appl. No. 12/12/539,446.

USPTO Apr. 20, 2012 Request for Continued Examination in response to Feb. 29, 2012 Final Office Action from U.S. Appl. No. 12/12/539,446.

USPTO Jun. 20, 2012 Non-Final Office Action from U.S. Appl. No. 12/539,446.

USPTO Nov. 9, 2011 Nonfinal Office Action from U.S. Appl. No. 12/539,446.

U.S. Appl. No. 12/12/539,446, filed Aug. 11, 2009, entitled "System and Method for Providing Access in a Network Environment," Inventor(s): Steve Hratko et al.

U.S. Appl. No. 12/726,224, filed Mar. 17, 2010, entitled "System and Method for Providing Rate Control in a Network Environment," Inventor(s): Mark Grayson et al.

Wikipedia, "Distributed minimum spanning tree," http://en.wikipedia.org/wiki/Distributed_minimum_spanning_tree, Dec. 18, 2008, 2 pages.

V. Chandrasekhar and J.G.Andrews, "Femtocell Networks: A Survey," The University of Texas at Austin; A. Gatherer, Texas Instruments; Jun. 28, 2008; 23 pages.

Kineto Wireless, Inc., "UMA: The 3GPP Standard for Femtocell-to-Core Network Connectivity," Aug. 2007; 9 pages.

Wikipedia, "Minimum spanning tree," http://en.wikipedia.org/wiki/Minimum_spanning_tree, Dec. 18, 2008, 5 pages.

Wikipedia, "Plectron," http://en.wikipedia.org/wiki/Plectron, Dec. 18, 2008, 2 pages.

Positron Public Safety Systems, "Product Specifications: Power RADIO," http://www.positron911.com/products/powerRADIO/powerRADIO_specs.asp, Dec. 18, 2008, 2 pages.

B. Berry et al., PPP Over Ethernet (PPoE) Extensions for Credit Flow and Link Metrics; RFC 4938; Jun. 2007; http://www.ietf.org/rfc/rfc4938.txt.pdf; 17 pages.

Thunder Eagle, Inc.—Radio Wireless Alerting Systems, "MRI-100™: Multi Radio Interface," http://www.thuneagle.com/mri100.htm, Dec. 18, 2008, 2 pages.

Broadband Forum, "TR-196 Femto Access Point Service Data Model," Issue 1; Issue Date: Apr. 2009; 131 pages.

U.S. Appl. No. 13/551,374, filed Jul. 17, 2012, entitled "System and Method for Indicating a Level of RAN Congestion for User Plane Traffic in a Network Environment," Inventor(s): Nirav Salot et al.

USPTO Sep. 13, 2012 Response to Jun. 20, 2012 Non-Final Office Action from U.S. Appl. No. 12/539,446.

USPTO Sep. 28, 2012 Non-Final Office Action from U.S. Appl. No. 12/726,224.

U.S. Appl. No. 14/044,734, filed Oct. 2, 2013, entitled "Reporting Radio Access Network Congestion Information in a Network Sharing Environment," Inventor(s): Maulik Vijay Vaidya, et al.

USPTO Sep. 5, 2013 Response to Jun. 6, 2013 Final Office Action from U.S. Appl. No. 12/539,446.

USPTO Dec. 17, 2012 Non-Final Office Action from U.S. Appl. No. 12/539,446.

USPTO Dec. 12, 2012 Response to Sep. 28, 2012 Non-Final Office Action from U.S. Appl. No. 12/726,224.

USPTO Jan. 23, 2013 Notice of Allowance from U.S. Appl. No. 12/726,224.

USPTO Dec. 20, 2013 Non-Final Office Action from U.S. Appl. No. 13/551,374.

USPTO Mar. 11, 2013 Response to Non-Final Office Action dated Dec. 17, 2012 from U.S. Appl. No. 12/539,446.

USPTO Jun. 6, 2013 Final Office Action from U.S. Appl. No. 12/539,446.

USPTO Jun. 5, 2014 Non-Final Office Action from U.S. Appl. No. 12/539,446.

USPTO Jun. 4, 2014 Final Office Action from U.S. Appl. No. 13/551,374.

* cited by examiner

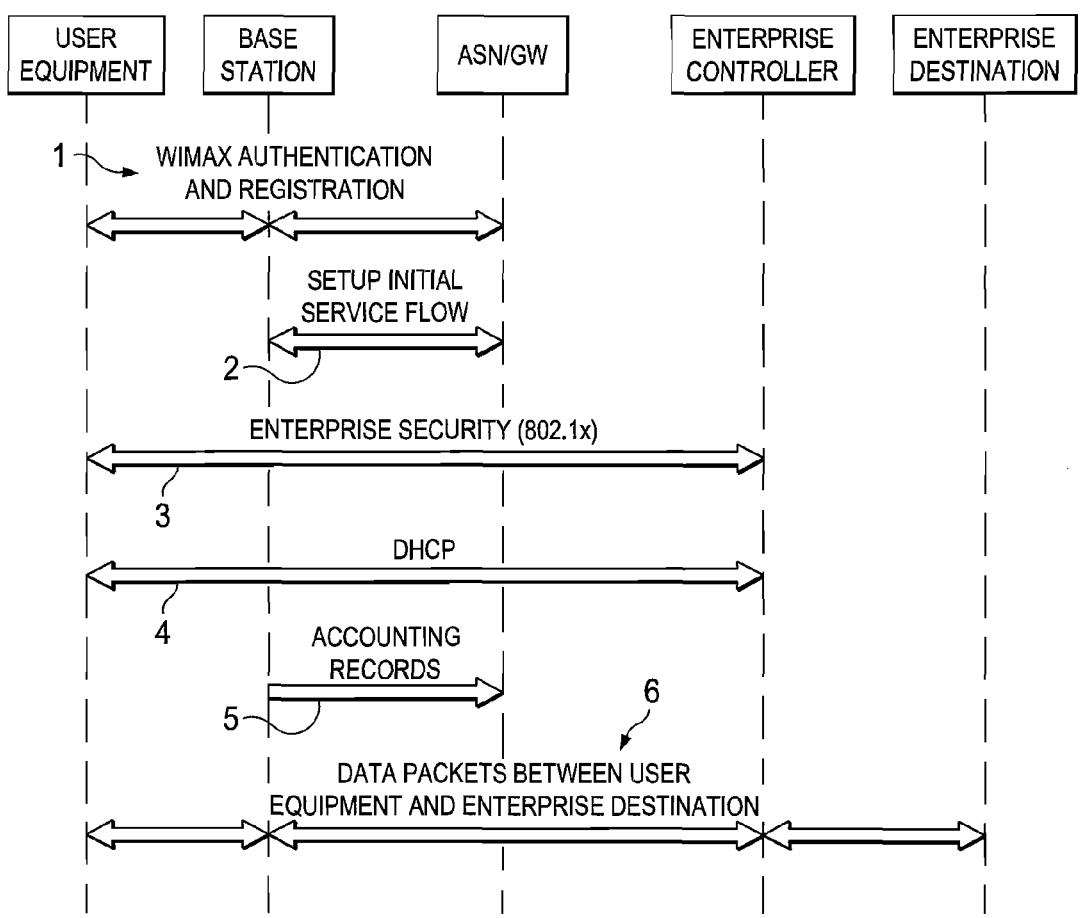

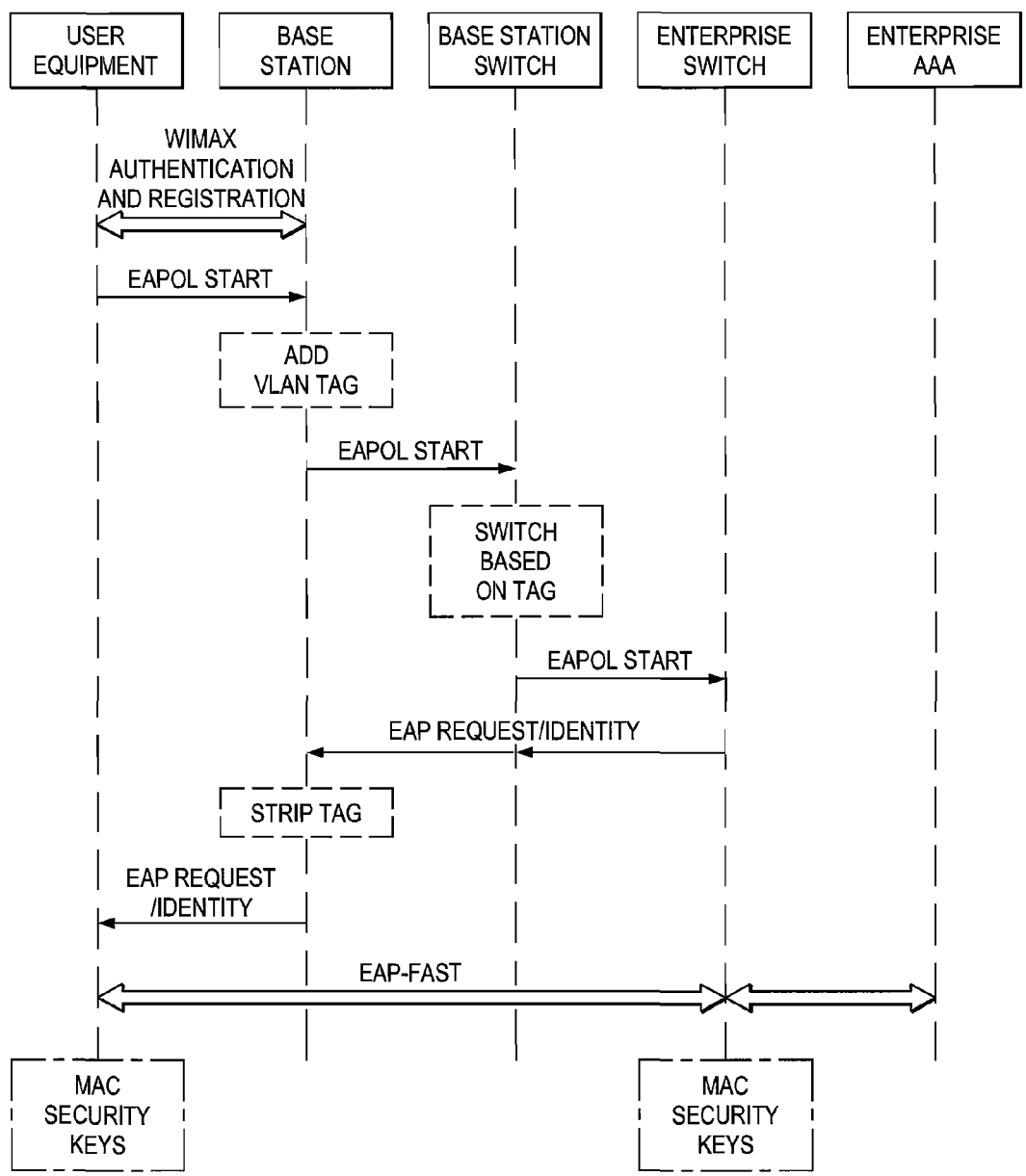

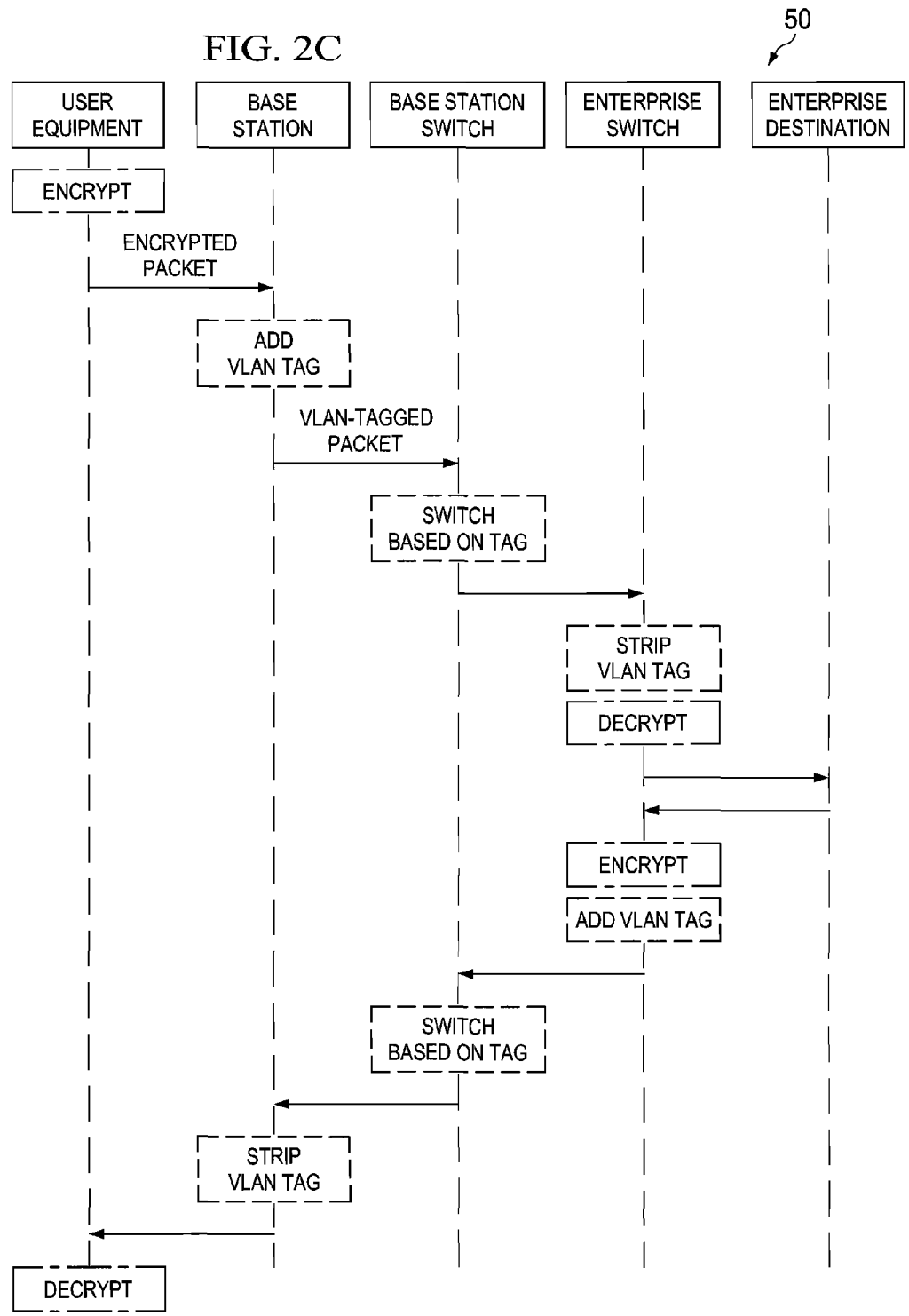

SYSTEM AND METHOD FOR PROVIDING ENTERPRISE INTEGRATION IN A NETWORK ENVIRONMENT

TECHNICAL FIELD

This disclosure relates in general to the field of communications and, more particularly, to providing enterprise integration in a network environment.

BACKGROUND

Networking architectures have grown increasingly complex in communication environments. Multi-access networks (e.g., Wi-Fi and WiMax) have gained notoriety in recent times. WiMax can enable the delivery of last mile wireless broadband access as an alternative to wired broadband. Multi-access networks can pose a number of problems. For example, issues can arise in various user authentications, which may have to be coordinated across disparate networks. In many scenarios, different domains have little coordination, even though they serve the same group of end users. Enterprise integration can be difficult because (commonly) the service provider controls the credentials that are used to authenticate users. If not properly accounted for, two distinct authentications can create unnecessary overhead and delay, as an end user is generally forced to comply with both protocols. Thus, enterprise network integration presents a significant challenge to network operators, device designers, and system administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-C are simplified flow diagrams illustrating potential operations associated with the communication system;

DETAILED DESCRIPTION OF EXAMPLE EMBODIMENTS

Overview

A method is provided in one example embodiment and includes receiving a request to authenticate an end user in a service provider network, and evaluating the request to identify the end user as belonging to an enterprise network. A tag is generated for a packet associated with a flow for the end user in the enterprise network. Routing occurs for subsequent packets associated with the flow between the enterprise network and the end user. The subsequent packets associated with the flow are not routed through the service provider network. In more particular embodiments, the end user is authenticated in the enterprise network after being authenticated in the service provider network. In addition, traffic for the end user can be separated based on one or more tags identified within the flow. A plurality of flows can be classified based on a customer identification (CID). An Ethernet convergence sublayer can be activated for the flow in response to a completed registration associated with the end user. The tag can be a virtual local area network (VLAN) tag generated at a base station.

Example Embodiments

Figure 1:
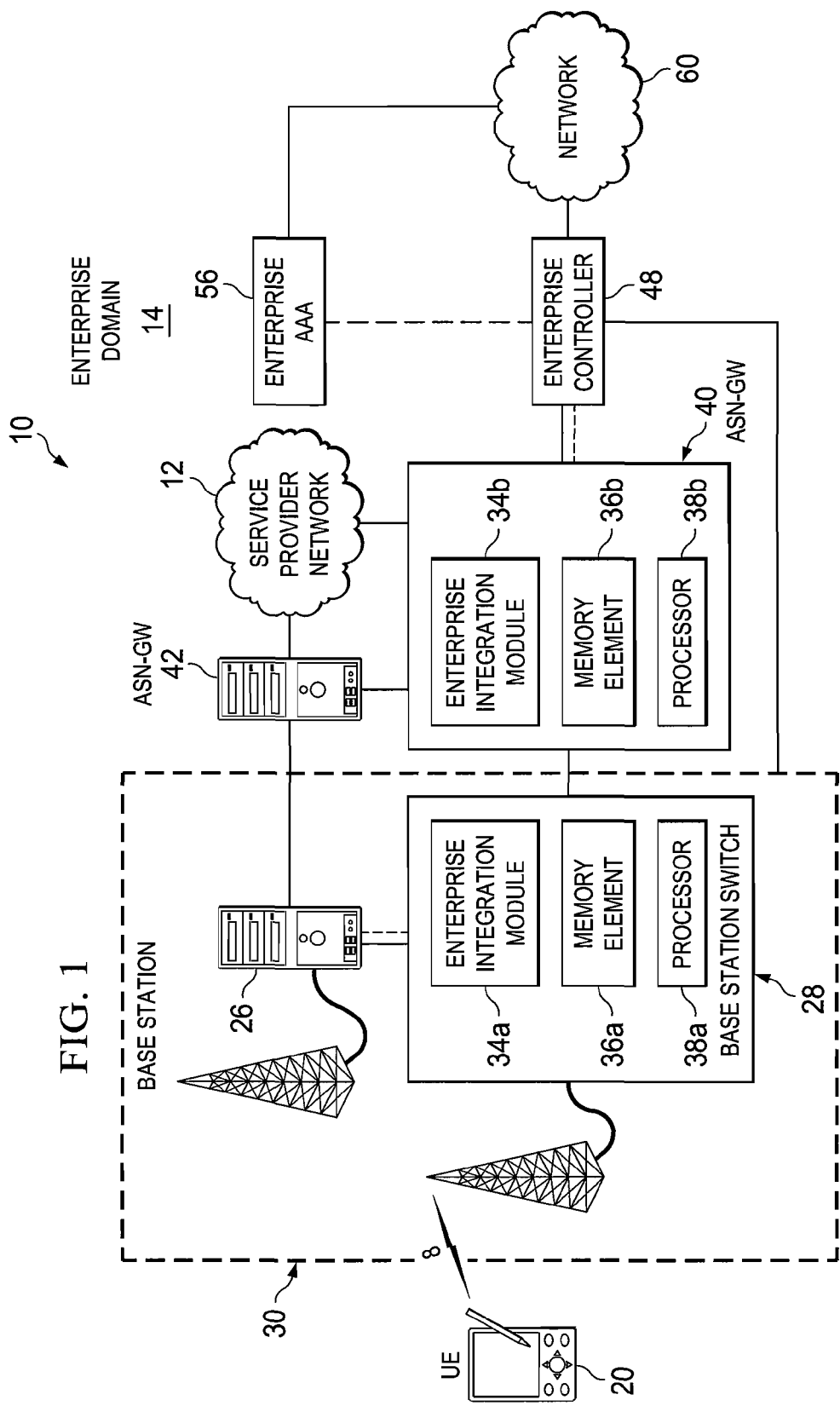
FIG. 1 is a simplified block diagram of a communication system for providing enterprise integration in a network environment in accordance with one embodiment of the present disclosure.

Turning to FIG. 1, FIG. 1 is a simplified block diagram of a communication system 10 for providing enterprise integration in a network environment. FIG. 1 may include a service provider network 12, an enterprise domain 14, and user equipment (UE) 20. FIG. 1 may also include a base station 30, which may include a set of base station switches 26 and 28. In addition, depicted are access service network (ASN)-gateways (GWs) 40 and 42, where at least one of these gateways has a logical connection to an enterprise controller 48, which is coupled to a network 60. Network 60 has a logical connection to an enterprise authentication, authorization, and accounting (AAA) 56 in enterprise domain 14. In one example implementation, base station switch 28 may include an enterprise integration module 34a, a processor 38a, and a memory element 36a. In a similar fashion, ASN-GW 40 may include an enterprise integration module 34b, a processor 38b, and a memory element 36b. These two elements have been expanded in FIG. 1 to highlight potential internal components provided therein, where peer elements may include similar components to achieve the functionalities described below. Communication system 10 may include multiple instances of UE 20, which can be coupled to multiple base stations 30 and to multiple Wi-Fi access points (not shown) through a suitable interface (e.g., an R1 interface in a WiMax implementation). In one example, each base station and each Wi-Fi access point may be coupled to a respective access service network gateway, which may further include a foreign agent.

For purposes of illustrating certain example techniques of communication system 10, it is important to understand the communications that may be traversing the network and which manage authentication mechanisms for a given end user. The following foundational information may be viewed as a basis from which the present disclosure may be properly explained. An end user service (e.g., network connectivity/access) can be provided through a WiMAX network by service provider network 12. In some instances, the actual service provider could be a carrier (such as AT&T or Verizon). In a typical configuration, an end user would establish a connection through a base station and to the gateway in the service provider's network. User traffic would then flow through that particular gateway, which has a logical connection to the end user. If the end user in this particular instance sought to access work e-mail, corporate payroll services, etc., these activities would likely implicate an enterprise network, which is a separate entity.

In order to access this work account information, the end user would typically set up a virtual private network (VPN) connection, which would be logically on top of the connection to the WiMAX network. This protocol typically provides a secure connection to the enterprise network over the WiMAX connection. The enterprise entity is forced to establish and to maintain VPN servers for these end-user activities. It should also be noted that authentication for VPN networks can be expensive and consume an inordinate amount of time. Essentially, there is inherent complexity in configuring and coordinating VPN connections.

In another embodiment, the service provider can provide enterprise VPN service in the form of a specific Access Point Name (APN). In this case, the mobile user connects to the specific APN and the service provider establishes a VPN from its network to the enterprise system. New networking configurations can place a base station within the enterprise network. More recently, and with the advent of femto cells, there is considerable interest in deploying 3G base stations inside the enterprise. These deployments add a layer of complexity for traffic propagating through the enterprise network. For example, once an enterprise connection is established, the user is free to access information residing in the enterprise. The objective in these base station setups is to provide an efficient access to enterprise services for mobile users (e.g., 3G users, 4G users, etc.). The challenge lies in coordinating two distinct domains (i.e., a service provider domain and an enterprise domain), which commonly have little or no coordination.

Routing packets between the service provider network and the enterprise network creates redundancies and inefficiencies. For example, a flow can be received at the enterprise base station, then sent back to the service provider network, and then returned back to the enterprise network. This apparent lack of coordination inhibits routing performance and, further, presents an unacceptable delay for routing packets in enterprise network scenarios.

Communication system 10 can provide a viable alternative to these flawed communication protocols. The architecture of FIG. 1 can offer an alternative approach for providing more efficient enterprise access by facilitating a local breakout for end user traffic. In one example implementation, communication system 10 can offer a dual authentication in providing a local breakout using Ethernet convergence across a wireless link (e.g., 802.1X, 802.1AE). The approach can identify the end user (e.g., at the base station) as being an enterprise user, where an appropriate virtual local area network (VLAN) tag is developed for the particular enterprise end user. Thus, an initial request from an end user can be inspected in order to determine whether the request is associated with an enterprise domain. These preliminary identification and tagging activities set up significant changes in the subsequent routing of end user traffic. In a general sense, the architecture can bootstrap an enterprise authentication mechanism at the end of a service provider authentication. In one instance, many of these significant activities can be achieved by a selected ASN-GW. Additionally, there can also be intelligence in the actual base station to separate the traffic between users and, further, to monitor the traffic appropriately. In terms of the differences between the described operations and typical VPN-based solutions, VPN connectivity can be replaced by layer-2 connectivity. The VPN client may be replaced by an 802.1x client. In addition, the IP security (IPSec) protocol can be replaced by a combination of 802.1x and 802.1AE. In addition, such a solution can enable a local breakout (when applicable) for an enterprise femto arrangement. Specific operations are best illustrated via one or more examples that are offered below with reference to FIGS. 2A-2C.

Before turning to some of the operations of this architecture, a brief discussion is provided about some of the infrastructure of FIG. 1. UE 20 can be associated with clients, customers, or end users wishing to initiate a communication in communication system 10 via some network. The term 'user equipment' is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. UE 20 may also be inclusive of a suitable interface to the human user, such as a microphone, a display, or a keyboard or other terminal equipment. UE 20 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

ASN-GWs 40 and 42, and base station 30 are network elements that facilitate service flows between endpoints and a given network (e.g., for networks such as those illustrated in FIG. 1). As used herein in this Specification, the term 'network element' is meant to encompass routers, switches, gateways, bridges, loadbalancers, firewalls, servers, processors, modules, or any other suitable device, component, element, or object operable to exchange information in a network environment. The network elements may include an enterprise integration module to support the activities associated with enterprise authentication, as outlined herein. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, ASN-GW 40 and/or base station switch 28 includes software to achieve or to foster the authentication operations, as outlined herein in this document. Note that in one example, base station 30 includes base station switch 28, which has an internal structure (e.g., with a processor, a memory element, etc.) to facilitate some of the operations described herein. This internal structure may be provided in other internal elements within base station 30. In other embodiments, all of these authentication features may be provided externally to these elements or included in some other network device to achieve this intended functionality. Alternatively, ASN-GW 40 and base station switch 28 include this software (or reciprocating software) that can coordinate with each other in order to achieve the operations, as outlined herein. In still other embodiments, one or both of these devices may include any suitable algorithms, hardware, software, components, modules, interfaces, or objects that facilitate the operations thereof.

Enterprise AAA 56 represents server programs that handle requests [from other network elements on behalf of user equipment] for access to networking resources. Networking resources refers to any device, component, or element that provides some functionality to endpoints communicating in communication system 10. For a corresponding network, AAA elements [i.e., a visited AAA element and enterprise AAA 56] may also provide authentication, authorization, and accounting services and management. Authorization generally refers to the process of giving endpoints permission to do, or to access, something. In multi-user computer systems, a system administrator may define for the system which end users are allowed access to particular data in the system and, further, what privileges are provided for endpoints. Once an end user has logged into a network, the network may wish to identify what resources the end user is given during the communication session. Thus, authorization within communication system 10 may be seen as both a preliminary setting up of permissions by a system administrator, and the actual checking or verification of the permission values that have been set up when the end user is attempting access. Authentication generally refers to the process of determining whether the end user is in fact who or what it is declared to be.

AAA elements typically interact with network access servers and gateway servers, and with databases and directories containing user information. One standard by which devices or applications communicate with an AAA element is through a Remote Authentication Dial-In User Service (RADIUS) protocol, while other standards that could be employed include the Terminal Access Controller Access Control System (TACACS) or DIAMETER protocols. AAA elements may receive the IP address and other parameters from any suitable source, such as a dynamic host configuration protocol (DHCP) server or a domain name system (DNS) database element, in order to direct data to be communicated to an end user. The AAA element may include any suitable hardware, software, component, or element that operates to receive data associated with an end user and that provides corresponding AAA related functions to network components within communication system 10.

ASN-GW 40 can provide access gateway functions between the wireless domain and the IP network. In example embodiments, it can be the first hop IP router from the user's perspective and, further, provide network access server (NAS) and accounting client capabilities for interaction with AAA servers. ASN-GW 40 can support access network authentication and security functions. ASN-GW 40 can also provide local mobility anchor capability so that users can move between base stations. ASN-GW 40 also caches authentication and security information to accommodate fast roaming of users across base stations or between ASN-GWs 40 and 42. ASN-GW 40 can provide the termination of the mobility function across base stations and the foreign agent function. ASN-GW 40 can also map the radio bearer to the IP network. Additionally, it can act as an IP gateway for the IP host function that is located on the base station. In certain examples, ASN-GW 40 can offer IP functions performed for the access network including end-to-end quality of service, mobility, and security.

FIG. 2A is a simplified flow diagram that illustrates a call flow 44, which involves user equipment, a base station, an ASN/GW, an enterprise controller, and an enterprise destination. The enterprise controller can simply be a gateway or switch into the enterprise, and this controller can ensure authorized access into the enterprise. The enterprise destination could be virtually any location in the network for which access is sought by a particular end user. For example, if the end user were employed at Home Depot, the enterprise destination could be a web server maintained by this company for its employees.

On power up, user equipment can be configured to initiate a request for a connection with a service provider. A user agreement can be authenticated by the service provider based on various service provider credentials (e.g., subscriber identity module (SIM), Universal SIM (USIM), certifications, etc.). More specifically, a WiMAX device can be authenticated by the service provider using some predetermined financial relationship. This is illustrated by step one of FIG. 2A. The authentication can be based on a device certificate, user name, or some other appropriate credential, which authorizes the user to access network services. Authentication data and key management traffic can be routed through a public virtual local area network (VLAN) to the service provider network. In addition, the WiMAX device can register with its associated ASN-GW. In this particular instance, the registration traffic can be routed through a public VLAN, which is not depicted in this particular illustration.

At step two, the user equipment can establish a layer-2 connection with an enterprise switch (e.g., the enterprise controller) in the enterprise. This could be done through Ethernet convergence, where a data pathway is properly established between user equipment and the ASN-GW. After authentication, an initial service flow is created and used by the WiMAX subscriber to send DHCP messages. More specifically, because the device can send DHCP messages to the enterprise, this particular step can be circumvented. In one example implementation, the ASN-GW could be configured to eliminate this step based on the AAA service flow policy. The ASN-GW can create pre-provisioned service flows specifying a convergence option/mode as an Ethernet convergence sublayer (CS). The CS is a WiMAX specific protocol sublayer that converges different types of transport layer protocol session data units to a single service access point (SAP) interface. This capability of CS can allow the 802.16 media access control (MAC) to be compatible with different transport layer protocols. In one example embodiment, the ASN-GW is configured such that whenever a device registers through a given base station, the Ethernet CS is activated. For the described service flows, the ASN-GW does not create a service flow path between the base station and the gateway.

Note that the ASN-GW can include some type of storage or memory element (or access to a database) that can associate a particular end user as someone who desires an enterprise service. For example, a simple list could be used to identify which users require special treatment for connections to a given enterprise. Thus, part of step one (as discussed above) is identifying a particular end user as an enterprise user. In addition, the ASN-GW can send a message to the base station indicating that all packets for this particular end user should have an enterprise specific VLAN tag. Step two is simply depicting how the base station can enforce the directives of step one. Hence, the consequence of the VLAN tagging activity and the Ethernet CS designation is shown in steps three and four. At step three, the enterprise switch authenticates the user. (Note that, logically, there are two authentications that occur in the architecture: one is associated with the service provider and the other is associated with the enterprise network.)

FIG. 2B and FIG. 2C further develop step three of FIG. 2A and, therefore, FIGS. 2B-2C are discussed below and then the discussion returns to step four of FIG. 2A. As a general proposition, there are several enterprise security parameters associated with a given end user. For example, the user can be authenticated by the enterprise using enterprise security schemes (such as username/password). In addition, user data to/from the enterprise is encrypted, where an assumption is made that the enterprise would not rely on the WiMAX connection. The Extensible Authentication Protocol (EAP) is an extension of a Point-to-Point Protocol (PPP) that allows arbitrary authentication methods, which use credential and information exchanges of arbitrary lengths. The EAP protocol can use enterprise credentials for authentication, where the EAP client can run on the WiMAX user equipment. The enterprise can deploy 802.1AE MAC security, or any other suitable security mechanism. Additionally, MAC packet data units (PDUs) can be encrypted between the subscriber station and the enterprise switch, and transported transparently through an operator network.

Turning to an example set of security procedures 46, FIG. 2B is a simplified flow diagram associated with communication system 10. In one particular instance, the enterprise authentication can be based on 802.1x, and it can provide a secure connection between the enterprise and the subscriber (e.g., based on 802.1AE). More specifically, the user authentication can be based on an enterprise ID. In one example, the end user can use an 802.1x port-based authentication mechanism at a private VLAN switch.

In this example, the EAP mechanism authenticates the end user based on enterprise passwords. This could protect the integrity and confidentiality for the particular user traffic. More specifically, FIG. 2B illustrates the EAP interaction involving the base station, the base station switch, the enterprise switch, and the enterprise AAA. The VLAN tag can be added by the base station and sent to the base station switch during the EAP over LAN (EAPOL) initiation. The base station switch can make switching decisions based on the tag. On the return path, the tag can be stripped by the base station. This results in the establishment of an EAP-flexible authentication via secure tunneling (EAP-FAST) mechanism. Note that the end user can be authenticated in the enterprise network using any suitable 802.1x based methods such as EAP-FAST, an Extensible Authentication Protocol-Transport Layer Security (EAP-TLS) mechanism, a Tunneled Transport Layer Security (EAP-TTLS) mechanism, a Protected Extensible Authentication Protocol (PEAP) mechanism, etc. Alternatively, any other suitable authentication tool can be used in this instance.

Once the authentication has been suitably achieved, security keys can be generated for encrypted traffic between the end user and the enterprise network. For example, MAC security keys can be generated and these keys may be exchanged between the user equipment and one or more enterprise components. Note that certain enterprises may require encryption even though the WiMAX base station is inside the enterprise. In one instance, the architecture can use an Ethernet payload encryption between the WiMAX client and the switch (e.g., MACsec, 802.1AE).

In terms of encryption, another security procedure 50 is depicted by FIG. 2C. The VLAN tagging operations described above are shown in FIG. 2C in conjunction with the encryption/decryption of packets. For example, a packet can be encrypted by user equipment initially and, subsequently, decrypted by the enterprise switch before delivering the packet to the enterprise destination. On the return path, the packet can once again be encrypted by the enterprise destination and suitably decrypted when it arrives at the user equipment. In addition, and along similar reasoning as that discussed above, the base station can add a VLAN tag, where the base station switch can switch packets based on the tag. The VLAN tag can be stripped by the enterprise switch, where it could be subsequently added back to packets received by the enterprise switch on the return path. Again, the base station switch can switch packets based on the tag, where the VLAN tag is stripped by the base station before being delivered to the user equipment.

Returning to FIG. 2A, at step four, enterprise traffic from/to this subscriber can be transported through a secure connection via the enterprise switch. More specifically, a WiMAX device can use a "virtual" Ethernet MAC address for Ethernet convergence. The DHCP client on the WiMAX device can acquire the IP address from the DHCP server in the enterprise. For packets flowing from user equipment to the enterprise, the base station can tag IP packets from the WiMAX device with a public VLAN tag. The base station VLAN switch can be configured to switch tagged packets toward the enterprise VLANs. For packets flowing from the enterprise to the user equipment, tagged VLAN packets from the enterprise can be switched by the base station switch toward the base station. The base station can subsequently strip this VLAN tag. Incoming packets can be classified for a specific customer ID (CID) (e.g., based on Ethernet address and/or IP address).

At step five, certain WiMAX implementations may use the ASN-GW to track user data and to create charging records. This reflects administrative operations associated with the network. In this case, since user data does not go through a gateway, charging records can be maintained at the base station. The base station can maintain records per-user (or per service-flow). In one example, periodically, base station can send accounting records to the gateway. The gateway can collect other records and send aggregated records to an appropriate AAA server. Alternately, the base station may send records to the AAA server directly. Step six merely illustrates how data packets could continue to be exchanged between the user equipment and the enterprise destination.

Figure 3:
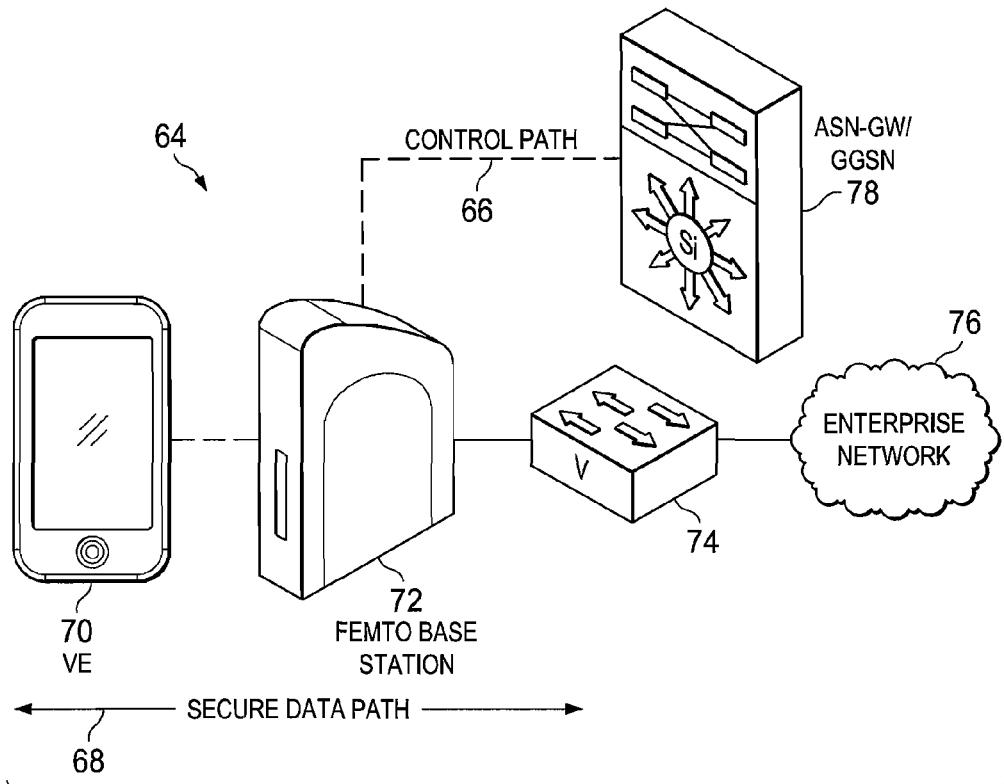
FIG. 3 is a simplified block diagram illustrating an alternative configuration for the communication system.

FIG. 3 is a simplified schematic diagram illustrating a local connectivity arrangement 64 associated with communication system 10. This particular arrangement depicts how a base station could reside in the same premise as the enterprise. These two elements could be connected via a single hub (e.g., through a suitable physical cable, through an Ethernet connection, etc.) to an Enterprise controller. FIG. 3 includes user equipment 70, a femto base station 72, an enterprise controller 74, and an enterprise network 76. Also provided in this particular architecture is an ASN-GW/gateway GPRS support node (GGSN) 78, which is logically coupled via a control path 66 to femto base station 72. In addition, a secure data path 68 is provided between user equipment 70 and enterprise controller 74. Although not shown, there is a service provider network to which ASN-GW/GGSN 78 can attach. In this particular example, a wireless base station is in the enterprise network. To enable a local breakout, a base station can tag uplink packets from the subscriber with a VLAN tag. The tag ensures that the packets are routed to the enterprise switch rather than tunneled into the service provider.

Figure 4:
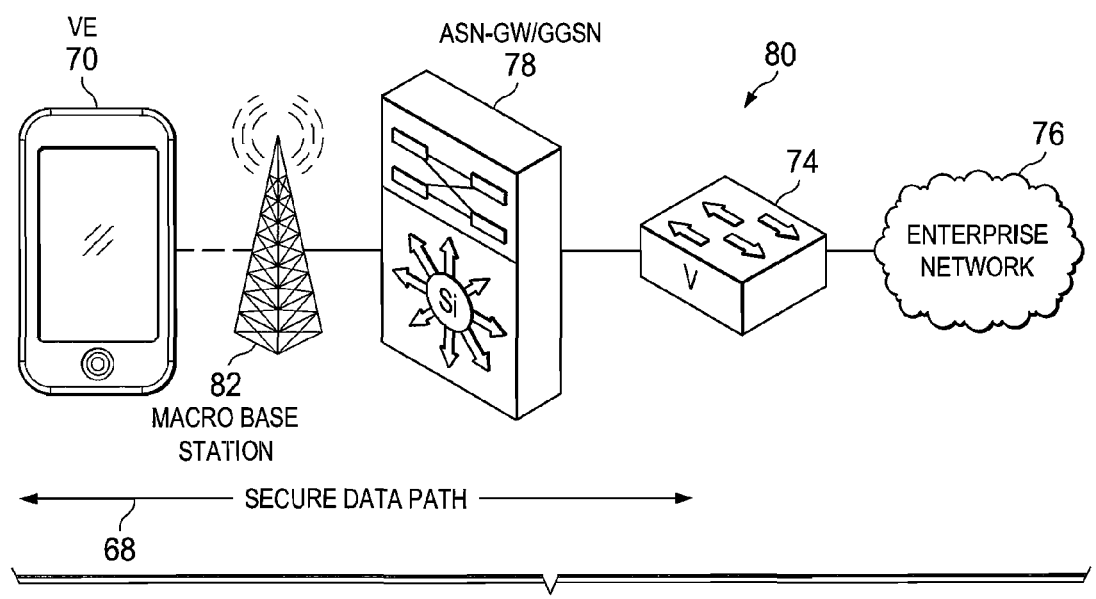
FIG. 4 is a simplified block diagram illustrating another alternative configuration for the communication system.

FIG. 4 is a simplified schematic diagram illustrating a remote connectivity arrangement 80, which shares components similar to those depicted in FIG. 3. In this particular case, a macro wireless base station 82 is hosted in the service provider network. To enable remote connectivity, the ASN-GW or an element in the service provider network (e.g., a home agent, etc.) can set up a pseudo-wire connection from the enterprise to a corresponding switch in the enterprise. Thus, in one example implementation, pseudo-wire emulation can be used to achieve the operations outlined herein. In essence, the hard-wired configuration as discussed in FIG. 3 could not be supported in such a configuration. Thus, FIG. 4 is depicting a scenario in which a pseudo-wire is replacing a physical connection between the base station and an Ethernet controller. This is also expanding on one possible activity associated with step three of FIG. 2A, where the other related activities would be similar.

Note that in certain example implementations, the authentication and/or tagging functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, ASN-GW 40 and/or base station switch 28 include software in order to achieve the authentication functions outlined herein. These activities can be facilitated by enterprise integration modules 34*a-b*. Both ASN-GW 40 and/or base station switch 28 can include memory elements for storing information to be used in achieving the intelligent authentication and tagging operations as outlined herein. Additionally, each of these devices may include a processor that can execute software or an algorithm to perform the intelligent authentication and tagging activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain AAA, registration, and authentication protocols, communication system 10 may be applicable to other exchanges, routing protocols, authentication protocols, or routed protocols in which packets (not necessarily the routing protocol/packets described) are exchanged in order to provide AAA information, authentication, registration, QoS parameters, etc. In addition, other example environments that could use the features defined herein include Pico and femto architectures, where an appropriate authentication would occur for one or more users. Moreover, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
    receiving a request to authenticate an end user in a service provider network;
    evaluating the request to identify the end user as belonging to an enterprise network;
    generating a tag to be included in a packet associated with a flow for the end user in the enterprise network; and
    routing subsequent packets associated with the flow between the enterprise network and the end user via a path that avoids all service provider networks.

2. The method of claim 1, wherein the end user is authenticated in the enterprise network using a selected one of a group of authentication mechanisms, the group consisting of:
    a) an Extensible Authentication Protocol (EAP) Flexible Authentication via Secure Tunneling (EAP-FAST) mechanism;
    b) an Extensible Authentication Protocol-Transport Layer Security (EAP-TLS);
    c) a Tunneled Transport Layer Security (EAP-TTLS) mechanism; and
    d) a Protected Extensible Authentication Protocol (PEAP) mechanism.

3. The method of claim 1, further comprising:
    separating traffic for the end user based on one or more tags identified within the flow; and
    classifying a plurality of flows based on a customer identification (CID).

4. The method of claim 1, wherein generating the tag includes generating a virtual local area network (VLAN) tag at a base station.

5. The method of claim 1, further comprising:
    activating an Ethernet convergence sublayer for the flow in response to a completed registration associated with the end user.

6. The method of claim 1, further comprising:
    removing a tag within a selected packet before the selected packet is delivered to an end-user device.

7. The method of claim 1, further comprising:
    generating a security key to be used in the flow for encrypted traffic associated with the enterprise network.

8. One or more non-transitory tangible media that includes code for execution and when executed by a processor operable to perform operations comprising:
    receiving a request to authenticate an end user in a service provider network;

evaluating the request to identify the end user as belonging to an enterprise network;
generating a tag to be included in a packet associated with a flow for the end user in the enterprise network; and
routing subsequent packets associated with the flow between the enterprise network and the end user via a path that avoids all service provider networks.

9. The media of claim 8, wherein the end user is authenticated in the enterprise network after being authenticated in the service provider network.

10. The media of claim 8 being further operable to perform operations comprising:
separating traffic for the end user based on one or more tags identified within the flow; and
classifying a plurality of flows based on a customer identification (CID).

11. The media of claim 8, wherein generating the tag includes generating a virtual local area network (VLAN) tag at a base station.

12. The media of claim 8 being further operable to perform operations comprising:
activating an Ethernet convergence sublayer for the flow in response to a completed registration associated with the end user.

13. The media of claim 8 being further operable to perform operations comprising:
removing a tag within a selected packet before the selected packet is delivered to an end-user device.

14. An apparatus, comprising:
a memory element configured to store data,
a processor operable to execute instructions associated with the data, and
an integration module configured to:
receive a request to authenticate an end user in a service provider network;
evaluate the request to identify the end user as belonging to an enterprise network;
generate a tag to be included in a packet associated with a flow for the end user in the enterprise network; and
route subsequent packets associated with the flow between the enterprise network and the end user via a path that avoids all service provider networks.

15. The apparatus of claim 14, wherein the integration module is further configured to:
separate traffic for the end user based on one or more tags identified within the flow; and
classify a plurality of flows based on a customer identification (CID).

16. The apparatus of claim 14, wherein the end user is authenticated in the enterprise network after being authenticated in the service provider network, and wherein the tag is a virtual local area network (VLAN) tag.

17. The apparatus of claim 14, wherein the integration module is further configured to:
activate an Ethernet convergence sublayer for the flow in response to a completed registration associated with the end user.

18. The apparatus of claim 14, wherein the integration module is further configured to:
remove a tag within a selected packet before the selected packet is delivered to an end-user device.

19. The apparatus of claim 14, wherein the integration module is further configured to:
generate a security key to be used in the flow for encrypted traffic associated with the enterprise network.

20. The apparatus of claim 14, wherein the integration module is further configured to:
provision a pseudo-wire between a base station and an enterprise controller, which includes the integration module, and an Ethernet controller.

* * * * *